June 7, 1927.
F. R. MULLER
1,631,284
PROCESS OF MANUFACTURING MASTIC TILE AND THE LIKE
Filed Aug. 30, 1926
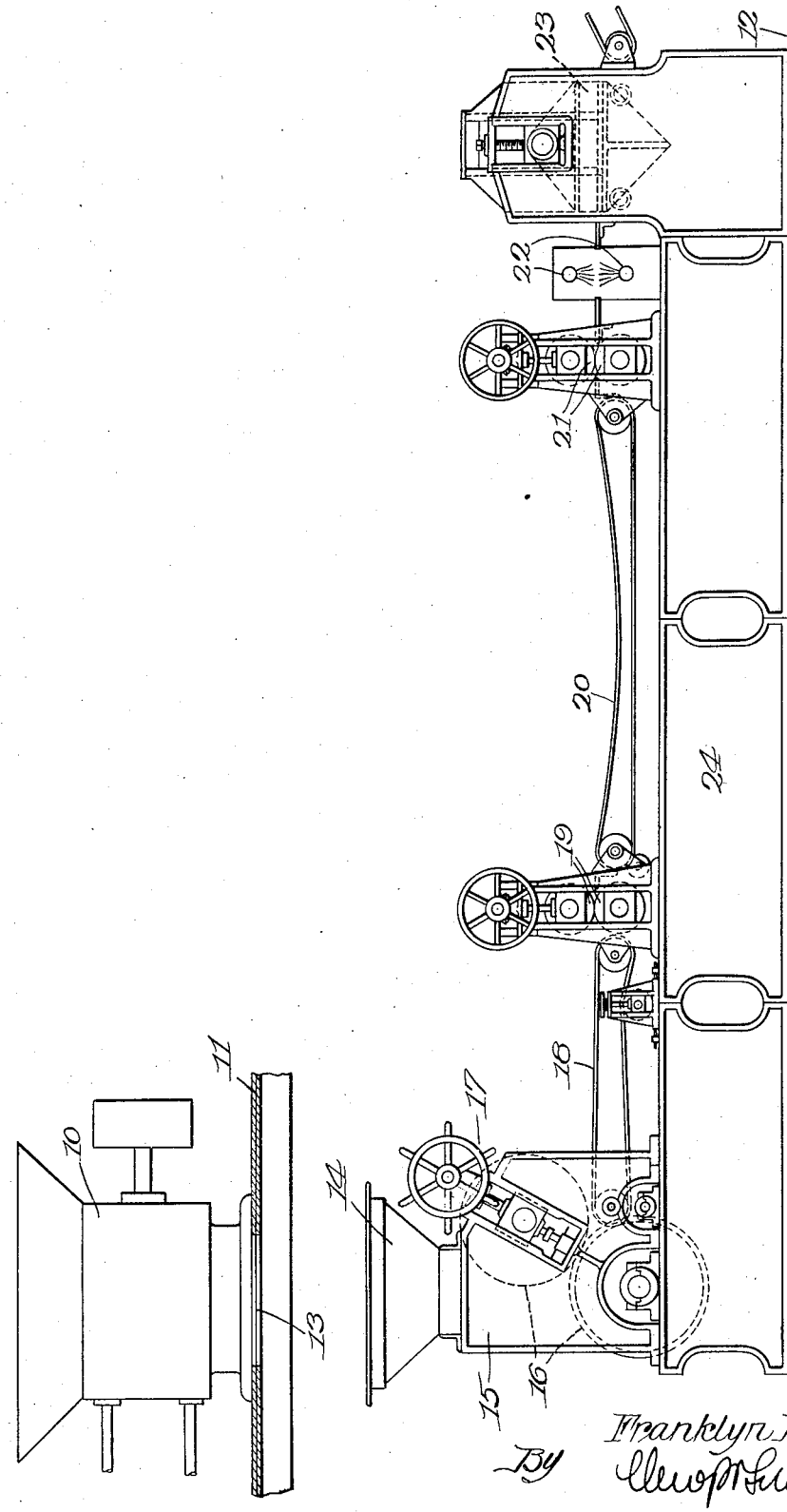

Patented June 7, 1927.

1,631,284

UNITED STATES PATENT OFFICE.

FRANKLYN R. MULLER, OF LAKE BLUFF, ILLINOIS, ASSIGNOR TO FRANKLYN R. MULLER, INC., OF WAUKEGAN, ILLINOIS, A CORPORATION OF ILLINOIS.

PROCESS OF MANUFACTURING MASTIC TILE AND THE LIKE.

Application filed August 30, 1926. Serial No. 132,460.

The present invention is concerned with a process of handling material adapted to be used for tiles, shingles, building materials, and for other purposes, and relates particularly to an improved process or method of manufacture for such articles.

It has been conventional in the production of mastic tiles and other objects of sheet mastic to employ calendering rolls. The materials which are commingled for producing the mastic sheets are first rendered plastic in small quantities and then repeatedly run through rolls of different thicknesses until a sheet of material of suitable thickness is secured. Manufacture on a production basis has been impossible in this crude manner, and the art had not been developed to any great extent until the patent of applicant, numbered 1,575,378, dated March 2, 1926, was granted.

The admixture of ingredients in the conventional manner just described has been wholly inadequate. The finished article so produced has always been streaked in appearance and structurally weak. Rubber or other resinous material has been employed to cause the heterogeneous mixture of asphaltum, gilsonite, silica, coloring material, and other ingredients, to adhere more closely one to another when used in larger percentums and to add resiliency when used in smaller proportions, but the addition of rubber has not solved the problem of manufacturing tiles, shingles, or other mastic sheet products.

An additional new and novel process for the production of sheet mastic material has been developed after extended and further continued experiments, and in conducting such experiments and in the development of this invention, the following objects have been attained: a process for the manufacture of mastic tiles and other mastic sheet material on a factory production basis; a unique method for treating materials to produce a mastic sheet wherein the ingredients are completely and thoroughly mixed; a process adapted to use the less expansive ingredients ordinarily employed in mastic sheet article manufacture for the purpose of reducing the material costs thereof; a process of continuous manufacture for mastic sheets producing uniformity in the resulting product, a higher quality sheet, and reducing labor costs; the adaptation of inexpensive materials for mastic sheets to an improved course of manufacture, eliminating a proportion of (or all) binders and allowing the use of a higher percentum of filler material; and a wholly new process for producing mastic sheets, such process introducing new steps or stages in the manufacture thereof, whereby higher quality and greater uniformity are obtained, and the production may be made a continuous process.

These objects, and such other objects as may hereinafter appear, are obtained by the novel steps employed in the process now to be described, and which is diagrammatically illustrated in the accompanying sheet of drawing, in which Figure 1 is a schematic layout, in elevation, of an assembly employed in carrying out the process herein described.

Like reference characters are used to designate similar parts in the drawing and in the description which follows:

In a factory for the production of mastic sheets by the process comprising the invention, two elevations are desirable. Stills for the reduction of asphalts and gilsonite to liquid form preferably are provided upon the upper elevation. The liquefied product from the stills is pumped directly from the stills in steam jacketed pipes to mixers, preferably also on the same floor, and in such mixers these materials are commingled with fillers. The proportion of gilsonite, asphalts, and fillers will be determined by the melting point desired for the finished product, gilsonite raising the fusion point of such product and giving greater hardness to the mass.

Mixers for the mass may be of a mechanical type for the handling of heavy materials in large quantities and these are also steam jacketed. The mixer (or mixers) discharges its batches into a chute delivering the plastic mass to a hopper leading to "forming" rolls, a part of a press preferably on the floor below, the rolls being adjustable to vary the thickness of sheet material discharged therefrom.

The press may be steam jacketed to permit of it continuing the heat in the plastic mass. The plastic material emptied into it is therefore kept from chilling before passing through the "forming" rolls. A recent experiment, however, discloses that such heating is not altogether necessary and that it may be dispensed with entirely.

Each of the forming rolls is internally chambered to permit of water circulating adjacent its peripheral wall to cool or heat said wall as is required. The forming rolls are preferably obliquely disposed, as is shown in the drawing.

A conveyor belt conveys the sheet material to a set of squeeze rolls where the thickness of the sheet is reduced and its surface made more smooth from contact with the polished surface thereof. As in the case of the forming rolls, the squeeze rolls are adapted to be heated or chilled and they are adjustable relatively to provide various thicknesses of sheet material.

A second conveyor belt conveys the material from the first set of squeeze rolls to a second set, which are actually squeeze rolls, but in this description will be referred to as "finishing" rolls to distinguish them from the first set of squeeze rolls.

Just beyond (and adjacent) the finishing rolls are sprayers. These are preferably longitudinally arranged so that the sheet material, still warm and plastic, may be sprayed from above and below as it leaves the finishing rolls. Hot or cold water may be employed, as required, and the quantity or force of the spray may be regulated by valve arrangements. Suitable draining facilities permit the excess water (or other liquid) to run off, either to sewerage or to be returned through the sprayers. The sprayers may be supplied with temperature regulating devices when so desired.

Adjacent the finishing rolls and beyond the sprayers, there may be a cutting device. A member having a plurality of cutting edges is arranged upon an eccentrically actuated carrier which is adapted to travel with the sheet material at the speed of such material during the entire cutting process. The cutting edges are arranged to give to the sheet passing through a deep scoring of the configuration of the finished article in process of manufacture. The carrier lifts the cutters when the scoring is completed and returns them to a cutting position. The cutting edges are preferably disposed so that each article is independently formed with a portion of unused material separating it from the adjacent articles.

Adjacent the traveling cutter is a belt conveyor for carrying away the cut objects and the waste. This belt is preferably obliquely disposed in order to convey the scored sheet material to the mixer level, where the material generally breaks (or may be broken) on the transverse scores and is removed and stocked. Subsequently or concurrently the articles formed by the scores are separated from the waste material therebetween and the imperfectly formed ones, the intermediate material and the imperfect objects being collected as waste, and the perfectly formed articles stacked and boxed. The material is usually still plastic and bends therein will be straightened out in the boxes from the weight of the articles themselves.

The waste is usually collected and mixed with succeeding batches of ingredients. In actual factory production there is no material waste whatever for the waste is rendered plastic by heat and used over again in conjunction with a subsequent batch of material.

The several rolls and the traveling cutter may be disposed upon a suitable longitudinal frame, and all parts driven by a single prime mover. If this is done each of the squeeze rolls should be geared to run at different speeds so as to take up the excess material which otherwise might gather upon the several conveyors.

Each set of rolls being more closely spaced together causes the sheet material to collect at the receiving side unless such succeeding sets of rolls have an increased speed to compensate therefor. It is better practice to provide each set of rolls with its own driving unit, the driving unit for the finishing rolls also actuating the traveling cutter. No difference in speed is necessary between the finishing rolls and the cutter for the cutter does not squeeze the material thinner. More sets of rolls than those described may be employed where desired, but the layout here shown has been found commercially practicable and of very high efficiency.

The typical layout just referred to and illustrated in the accompanying single sheet of drawing which is an elevation comprises, as is shown, a mixer 10 upon an upper elevation 11, which is adapted to discharge mixed material into the apparatus disposed upon a lower floor 12, and indicated by the extension lines. The stills for the reduction of the asphalts and gilsonite are independent apparatus and are not shown. The mixer 10 is of a steam jacketed variety.

The said mixer 10 discharges through floor 11 into a chute 13 which empties into a hopper 14 leading to a press 15 having forming rollers marked 16, which rolls 16 are adjustable. The instrumentalities for adjustment are clearly shown and marked 17.

A conveyor belt 18 advances the sheet material passing through the forming rollers 16 to squeeze rollers 19 from whence the sheet material is conveyed by a second belt 20 to a set of finishing rollers 21, and after such material has passed therethrough, it passes between the sprayers 22, and into a cutting device, designated 23. An integral or sectional frame upon which the apparatus on the lower floor 12 is mounted, is designated by the numeral 24.

The process is carried out by mixing the necessary ingredients in the steam heated mechanical mixers. Waste from previous operations may be added thereto or used in producing a batch of plastic material. The material when thoroughly plastic—about like bread dough in its plasticity but of course much heavier—is discharged into the hopper about the forming rolls. The hopper may be heated by a steam jacket but this is not always necessary. The forming rolls are cooled (ordinarily) by water. Cold rolls prevent adhesion of the material thereto and give to the sheet material produced a chilled upper and lower surface which assists in the further steps of manufacture.

Sheet material passes from the forming rolls onto a conveyor belt and is conveyed to the squeeze rolls where the surface of the material is smoothed and the sheet further reduced in thickness. It may be here further chilled if desired. The material is still quite plastic under ordinary conditions when it passes through the squeeze rolls.

From the squeeze rolls, the sheet is carried upon a belt conveyor to the finishing rolls. From the finishing rolls the material is passed between sprayers. The water in the sprayers may be warm to keep the material plastic, but under normal conditions it may be cool to reduce plasticity. The presence of the water tends to prevent the material from adhering to the cutters, and a clean cut deep scoring is thus obtainable.

From the sprayers, the material is forced under a travelling cutter and there divided into the commercial article—a tile, a shingle, etc. The finished article is carried away upon a conveyor belt together with the waste, the former to be marketed and the latter to be collected, made plastic and returned to the mixer.

A continuous process of manufacture for mastic tile, shingles, etc., and other objects is thus provided. Batches of mastic may be made uniform for each ingredient, may be carefully measured or weighed and the resulting article of manufacture is also uniform. Adequate mixing is had and production under this process can be speeded up to admit of commercial use. From chute to packing box is a cycle of but a few moments' duration.

By the use of an ancillary hopper in the "forming" rolls and of beaters comprising a shaft having thereon a plurality of variously shaped arms arranged transversely of said hopper, a veined or marbled effect in the finished sheet may be had. This, of course, necessitates the use of differently colored mastics, beaten in different mixers, and conveyed in proper proportion to the forming rollers and only partially admixed before pressing.

None of the deficiencies of the previously employed processes of mastic manufacture are present in the process here described for there is no necessity to mingle at calendering rolls small batches of material of different degrees of temperature. The difficulty of reheating, and the necessity to "cut" the material with gasoline, as has frequently heretofore been done, is avoided. A better product of cheaper ingredients results. A larger quantity of filler may be incorporated in the material. This increment increases its wearing qualities. Pigments may be completely and evenly distributed and the finished product possess a uniform color throughout, a total impossibility heretofore.

In place of tile cutters, "slitters" may be employed when "lengths" of sheet material are desired. Slitters comprise circular rotating knives adapted to cut the material longitudinally of the course of its travel from the squeeze rollers. Ordinarily such rotating knives are opposed and arranged in gangs upon shafts, the space between knives determining the width of the mastic sheet. Such "lengths" are used as fillers for stair treads and for expansion strips in concrete roads.

I claim:—

1. A process of producing sheet mastic which includes heating and mixing the ingredients thereof, passing the plastic material thus produced through chilled forming rolls, squeeze rolls, and a liquid spray.

2. A process of producing sheet mastic suitable for cutting into tiles, shingles, and the like, which includes the steps of mechanically mixing and heating the ingredients thereof to form plastic batches, successively depositing such batches between chilled sheet forming rolls, and passing the sheet material thus formed successively and while plastic between squeeze rolls, finishing rolls, and a liquid spray and a cutter device.

3. A process of manufacturing sheet mastic material which comprises mechanically mixing and heating a mass of ingredients high in filler material and low in binder material, passing the plastic mass through chilled sheet forming rolls, and subsequently passing the sheet thus formed through squeeze rolls, finishing rolls, a water spray, and a cutting device.

4. The process of producing a mastic tile or the like which comprises mixing the ingredients in the presence of heat, forcing the mass through chilled sheet forming rolls, and subsequently passing the sheet thus formed and while still plastic successively through squeeze rolls, a spray of water, and a cutter.

FRANKLYN R. MULLER.